United States Patent
Bautista Martin et al.

(10) Patent No.: US 12,198,275 B2
(45) Date of Patent: Jan. 14, 2025

(54) GENERATIVE SCENE NETWORKS

(71) Applicant: Apple Inc., Cupertino, CA (US)

(72) Inventors: Miguel Angel Bautista Martin, Cupertino, CA (US); Nitish Srivastava, Cupertino, CA (US); Joshua M. Susskind, Campbell, CA (US); Terrance Devries, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 338 days.

(21) Appl. No.: 17/689,851

(22) Filed: Mar. 8, 2022

(65) Prior Publication Data

US 2022/0292781 A1 Sep. 15, 2022

Related U.S. Application Data (60) Provisional application No. 63/161,941, filed on Mar. 16, 2021, provisional application No. 63/159,427, filed on Mar. 10, 2021.

(51) Int. Cl.
*G06T 19/00* (2011.01)
*G06T 15/55* (2011.01)
*G06T 19/20* (2011.01)

(52) U.S. Cl.
CPC ............ *G06T 19/003* (2013.01); *G06T 15/55* (2013.01); *G06T 19/20* (2013.01); *G06T 2219/028* (2013.01)

(58) Field of Classification Search
None
See application file for complete search history.

(56) References Cited

U.S. PATENT DOCUMENTS

| | | | |
|---|---|---|---|
| 2020/0211295 A1* | 7/2020 | Skidmore | G06F 3/011 |
| 2021/0090212 A1* | 3/2021 | Piat | G06T 3/14 |
| 2022/0239844 A1* | 7/2022 | Lv | G06T 15/205 |
| 2024/0005590 A1* | 1/2024 | Martin Brualla | G06T 15/04 |

OTHER PUBLICATIONS

Mescheder et al., "Which Training Methods for GANs do actually Converge?", Jul. 2018, Proceedings of the 35th International Conference on Machine Learning, pp. 3481-3490 (Year: 2018).*
Martin-Brualla et al., "GeLaTo: Generative Latent Textured Objects", Nov. 7, 2020, Springer International Publishing, Computer Vision-ECCV 2020: 16th European Conference, pp. 242-258 (Year: 2020).*

(Continued)

*Primary Examiner* — Kent W Chang
*Assistant Examiner* — Jonathan M Cofino
(74) *Attorney, Agent, or Firm* — BAKERHOSTETLER (57) ABSTRACT

Implementations of the subject technology relate to generative scene networks (GSNs) that are able to generate realistic scenes that can be rendered from a free moving camera at any location and orientation. A GSN may be implemented using a global generator and a locally conditioned radiance field. GSNs may employ a spatial latent representation as conditioning for a grid of locally conditioned radiance fields, and may be trained using an adversarial learning framework. Inverting a GSN may allow free navigation of a generated scene conditioned on one or more observations.

18 Claims, 7 Drawing Sheets

(56) References Cited

OTHER PUBLICATIONS

Ammirato, et al., "A Dataset for Developing and Benchmarking Active Vision," IEEE International Conference on Robotics and Automation (ICRA), 2017, pp. 1378-1385.
Chan, et al., "pi-GAN: Periodic Implicit Generative Adversarial Networks for 3D-Aware Image Synthesis," arXiv preprint arXiv:2012.00926, 2020.
Chang, et al., "ShapeNet: An Information-Rich 3D Model Repository," arXiv preprint arXiv:1512.03012, 2015.
Chaplot, et al., "Neural Topological SLAM for Visual Navigation," Proceedings of the IEEE/CVF Conference on Computer Vision and Pattern Recognition, pp. 12875-12884, 2020.
Chaplot, et al., "Object Goal Navigation using Goal-Oriented Semantic Exploration," Advances in Neural Information Processing Systems, 33, 2020.
Chen, et al., "Monocular Neural Image Based Rendering with Continuous View Control," Proceedings of the IEEE/CVF International Conference on Computer Vision, pp. 4090-4100, 2019.
Choi, et al., "Extreme View Synthesis," arXiv preprint arXiv:1812:04777v2, 2019.
Dai, et al., "Neural Point Cloud Rendering via Multi-Plane Projection," Proceedings of the IEEE/CVF Conference on Computer Vision and Pattern Recognition, pp. 7830-7839, 2020.
Devries, et al., "Improved Regularization of Convolutional Neural Networks with Cutout," arXiv preprint arXiv:1708.04552, 2017.
Dupont, et al., "Equivariant Neural Rendering," arXiv preprint arXiv:2006.07630, 2020.
Eslami, et al., "Neural scene representation and rendering," Science, 360(6394):1204-1210, 2018.
Fraccaro, et al., "Generative Temporal Models with Spatial Memory for Partially Observed Environments," arXiv preprint arXiv:1804.09401, 2018.
Goodfellow, et al., "Generative Adversarial Networks," arXiv preprint arXiv:1406.2661, 2014.
Guo, et al., "MS-celeb-1M: A Dataset and Benchmark for Large-Scale Face Recognition," European conference on computer vision, pp. 87-102. Springer, 2016.
Ha, et al., "World Models," arXiv preprint arXiv:1803.10122, 2018.
Henzler, et al., "Escaping Plato's VCave: 3D Shape From Adversarial Rendering," Proceedings of the IEEE International Conference on Computer Vision, pp. 9984-9993, 2019.
Heusel, et al., "GANs Trained by a Two Time-Scale Update Rule Converge to a Local Nash Equilibrium," arXiv preprint arXiv:1706.08500, 2017.
Hinton, et al., "Neural Networks for Machine Learning—Lecture 6a—Overview of mini-batch radient descent" 2012, retrieved from http://simplecore-dev.intel.com/nervana/wp-content/uploads/sites/55/2015/12/lecture_slides_lec6.pdf.
Jaderberg, et al., "Spatial Transformer Networks," arXiv preprint arXiv:1506.02025, 2015.
Johnson, et al., "CLEVR: A Diagnostic Dataset for Compositional Language and Elementary Visual Reasoning," Proceedings of the IEEE Conference on Computer Vision and Pattern Recognition, pp. 2901-2910, 2017.
Kajiya, et al., "Ray Tracing Volume Densities," ACM SIGGRAPH Computer Graphics, 18(3):165-174, 1984.
Karras, et al., "Analyzing and Improving the Image Quality of StyleGAN," Proceedings of the IEEE/CVF Conference on Computer Vision and Pattern Recognition, pp. 8110-8119, 2020.
Karras, et al., "Progressive Growing of GANs for Improved Quality, Stability, and Variation," arXiv preprint arXiv:1710.10196v3, 2018.
Karras, et al., "A style-based generator architecture for generative adversarial networks," Proceedings of the IEEE/CVF Conference on Computer Vision and Pattern Recognition, pp. 4401-4410, 2019.
Kempka, et al., "Vizdoom: A Doom-based AI Research Platform for Visual Reinforcement Learning," arXiv preprint arXiv:1605.02097v2, 2016.

Liu, et al., "Infinite Nature: Perpetual View Generation of Natural Scenes from a Single Image," arXiv preprint arXiv:2012.09855, 2020.
Liu, et al., "Neural Sparse Voxel Fields," arXiv preprint arXiv:2007.11571, 2020.
Liu, et al., "Towards Faster and Stabilized GAN Training for High-Fidelity Few-Shot Image Synthesis," arXiv e-prints, pp. arXiv-2101, 2021.
Mescheder, et al., "Which Training Methods for GANs do actually Converge?," International conference on machine learning, pp. 3481-3490. PMLR, 2018.
Mildenhall, et al., "Local Light Field Fusion: Practical View Synthesis with Prescriptive Sampling Guidelines," arXiv preprint arXiv:1905.00889, 2019.
Mildenhall, et al., "NeRF: Representing Scenes as Neural Radiance Fields for View Synthesis," arXiv preprint arXiv:2003.08934, 2020.
Morozov, et al., "On Self-Supervised Image Representations for GAN Evaluation," International Conference on Learning Representations, 2021.
Nguyen-Phuoc, et al., "HoloGAN: Unsupervised Learning of 3D Representations from Natural Images," Proceedings of the IEEE International Conference on Computer Vision, 2019.
Niemeyer, et al., "GIRAFFE: Representing Scenes as Compositional Generative Neural Feature Fields," arXiv preprint arXiv:2011.12100, 2020.
Olszewski, et al., "Transformable Bottleneck Networks," Proceedings of the IEEE International Conference on Computer Vision, pp. 7648-7657, 2019.
Planche, et al., "Incremental Scene Synthesis," 33rd Conference on Neural Information Processing Systems, 2019.
Rafique, et al., "Generative appearance flow: A hybrid approach for outdoor view synthesis," British Machine Vision Conference (BMVC), vol. 9, 2020.
Rebain, et al., "DeRF: Decomposed Radiance Fields," arXiv preprint arXiv:2011.12490, 2020.
Riegler, et al., "Free View Synthesis," arXiv preprint arXiv:2008.05511, 2020.
Riegler, et al., "Stable View Synthesis," arXiv preprint arXiv:2011.07233, 2020.
Savva, et al., "Habitat: A Platform for Embodied AI Research," Proceedings of the IEEE/CVF International Conference on Computer Vision, pp. 9339-9347, 2019.
Schwarz, et al., "GRAF: Generative Radiance Fields for 3d-Aware Image Synthesis," arXiv preprint arXiv:2007.02442, 2021.
Sitzmann, et al., "Implicit Neural Representations with Periodic Activation Functions," arXiv preprint arXiv:2006.09661, 2020.
Sitzmann, et al., "Scene Representation Networks: Continuous 3dD-Structure-Aware Neural Scene Representations," arXiv preprint arXiv:1906.01618, 2019.
Srinivasan, et al., "Pushing the boundaries of View Extrapolation with Multiplane Images," Proceedings of the IEEE/CVF Conference on Computer Vision and Pattern Recognition, pp. 175-184, 2019.
Straub, et al., "The Replica Dataset: A Digital Replica of Indoor Spaces," arXiv preprint arXiv:1906.05797, 2019.
Sun, et al., "Multi-view to Novel view: Synthesizing novel views with Self-Learned Confidence," Proceedings of the European Conference on Computer Vision (ECCV), pp. 155-171, 2018.
Tatarchenko, et al., "Multi-view 3D Models from Single Images with a Convolutional Network," European Conference on Computer Vision, pp. 322-337. Springer, 2016.
Trevithick, et al., "GRF: Learning a General Radiance Field for 3D Scene Representation and Rendering," arXiv preprint arXiv:2010.04595, 2020.
Xia, et al., "GAN Inversion: A Survey," arXiv preprint arXiv:2101.05278, 2021.
Yu, et al., "pixelNeRF: Neural Radiance Fields from One or Few Images," arXiv preprint arXiv:2012.02190, 2020.
Zhang, "Making convolutional networks shift-invariant again," International Conference on Machine Learning, pp. 7324-7334. PMLR, 2019.
Zhao, et al., "Differentiable Augmentation for Data-Efficient GAN Training," arXiv preprint arXiv:2006.10738, 2020.

(56) References Cited

OTHER PUBLICATIONS

Zhou, et al., "Stereo Magnification: Learning View Synthesis Using Multiplane Images," arXiv preprint arXiv:1805.09817, 2018.
Zhou, et al., "View Synthesis by Appearance Flow," European conference on computer vision, pp. 286-301, Springer, 2016.

* cited by examiner

GENERATIVE SCENE NETWORKS

CROSS REFERENCE TO RELATED APPLICATIONS

This application claims the benefit of priority to U.S. Provisional Patent Application No. 63/159,427, entitled "Generative Scene Networks," filed on Mar. 10, 2021, and U.S. Provisional Patent Application No. 63/161,941, entitled "Generative Scene Networks," filed on Mar. 16, 2021, the disclosure of each which is hereby incorporated herein in its entirety.

TECHNICAL FIELD

The present description relates to developing machine learning applications and, more particularly, to generative models of scenes, such as three-dimensional scenes.

BACKGROUND

Software engineers and scientists have been using computer hardware for machine learning to make improvements across different industry applications including language processing, camera and video processing, and scene understanding.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware.

Understanding the three-dimensional (3D) visual world is a fundamental problem in Computer Vision. A standing challenge is to learn how observations of the world change as the viewpoint changes. Spatial understanding entails the ability to infer the appearance of a scene when observed from any viewpoint or orientation. A wide range of geometry and learning-based approaches for 3D view synthesis can be used to interpolate between observed views of a scene, but are unable to infer the appearance of the scene from camera poses that are far from those observations. A limitation of these models is that they do not learn a prior over scenes. As a result, these models have limited performance in the extrapolation regime, whether it be inpainting disocclusions or synthesizing views beyond the boundaries of the observed scene.

As a specific example, the popular NeRF approach proposes to represent a scene via its radiance field, enabling continuous view interpolation given a densely captured scene, but does not learn a prior over multiple scenes. On the other hand, conditional auto-encoder models for view synthesis are able to synthesize views of some simple objects from multiple viewpoints and orientations, but are not designed to be view-consistent and tend to overfit to viewpoints seen during training. In order to, for example, provide neural networks that are able to understand and synthesize the 3D world effectively, models are disclosed herein that are able to learn a prior over scenes. As discussed herein, the models disclosed herein may be referred to as generative scene networks and may be implemented as neural networks.

A learned prior for scenes may be used for unconditional or conditional inference. One compelling use case for unconditional inference is to generate scenes and freely move through them in the absence of input observations, relying on the prior distribution over scenes and how they appear from different points of view. In addition, conditional inference lends itself naturally to different applications. For instance, by inverting scene observations back to the learned scene prior distribution it is possible to sample plausible scene completions. Such completions will not be subject to collapse to the mean like in auto-encoders.

In accordance with aspects of the subject technology, a generative model for scenes is provided whose practical impact spans a wide range of applications in Machine Learning and Computer Vision, including model-based reinforcement learning SLAM, content creation and adaptation for AR/VR or immersive 3D photography.

The subject technology provides Generative Scene Networks (GSNs). A GSN may be a generative model that learns representations of 3D scenes. A GSN may combine principles of Multi-View Geometry and Volumetric Rendering in a unified model. In one or more implementations, a GSN may be a generative model that employs a spatial latent representation as conditioning for a grid of local radiance fields with independent coordinate systems.

In one or more implementations, a GSN may be trained by adopting an adversarial learning framework. Inverting a GSN allows free navigation of a generated scene conditioned on a single (or multiple) observations. GSNs, as described herein, provide improvements to the computing functionality of a given electronic device by, for example, providing a model that is able to generate scenes that can be rendered from the view of a free moving (e.g., virtual) camera at any location and orientation in the generated scene. As discussed in further detail herein, GSNs obtain state-of-the-art results compared with recent baselines on challenging real-world datasets.

Figure 1:
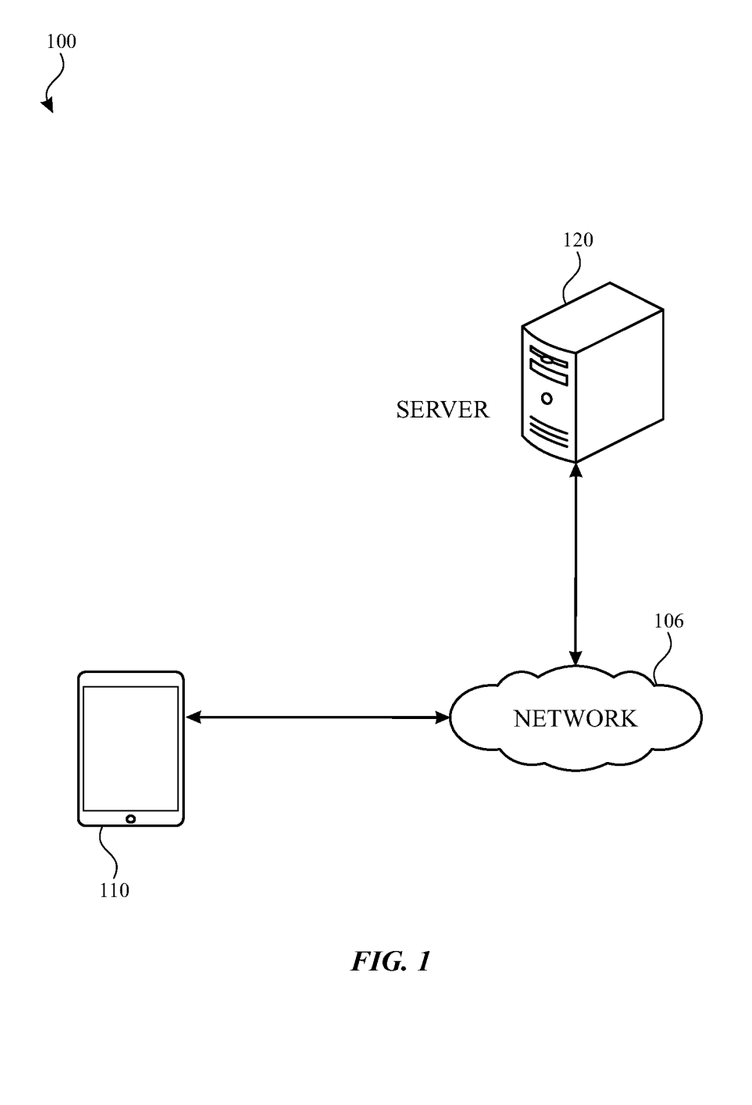
FIG. 1 illustrates an example network environment in accordance with one or more implementations.

FIG. 1 illustrates an example network environment 100 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, and the server 120; however, the network environment 100 may include any number of electronic devices and any number of servers.

The electronic device 110 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a mobile electronic device (e.g., smartphone). The electronic device 110 may be, and/or may include all or part of, the electronic system discussed below with respect to FIG. 3.

In one or more implementations, the electronic device 110 may provide a system for training a machine learning model using training data, where the trained machine learning model is subsequently deployed to the electronic device 110. Further, the electronic device 110 may provide one or more machine learning frameworks for training machine learning models and/or developing applications using such as machine learning models. In an example, such machine learning frameworks can provide various machine learning algorithms and models for different problem domains in machine learning. In an example, the electronic device 110 may include a deployed machine learning model that provides an output of data corresponding to a prediction or transformation or some other type of machine learning output.

The server 120 may provide a system for training a machine learning model using training data, where the trained machine learning model is subsequently deployed to the server 120. In an implementation, the server 120 may train a given machine learning model for deployment to a client electronic device (e.g., the electronic device 110). The machine learning model deployed on the server 120 and/or the electronic device 110 can then perform one or more machine learning algorithms. In an implementation, the server 120 provides a cloud service that utilizes the trained machine learning model and continually learns over time.

An open problem in Computer Vision is modeling the distribution of 3D scenes. In some scenarios, two-dimensional (2D) generative models are capable of disentangling important 3D properties in their latent spaces, such as camera pose and lighting, but the usefulness of these 2D models for 3D applications is still limited. In some scenarios, 3D generative modelling can generate radiance fields, which naturally capture important properties such as multi-view consistency and view-dependent lighting. However, these 3D generative models are often only able to generate single objects, such as cars or faces. Due to the size and complexity of, for example, large indoor scenes, existing models lack the representational capacity to adequately capture the modelling of large indoor scenes. In order, for example, to address this limitation, the Generative Scene Networks (GSNs) are described herein. In one or more implementations, GSNs are neural networks that are configured to learn to decompose global representations of scenes into a collection of many local representations. This increased representational capacity can ultimately improve sample fidelity and diversity. In one or more implementations, the local representation learned by a GSN can be used for downstream tasks, such as scene editing and view synthesis.

Figure 2:
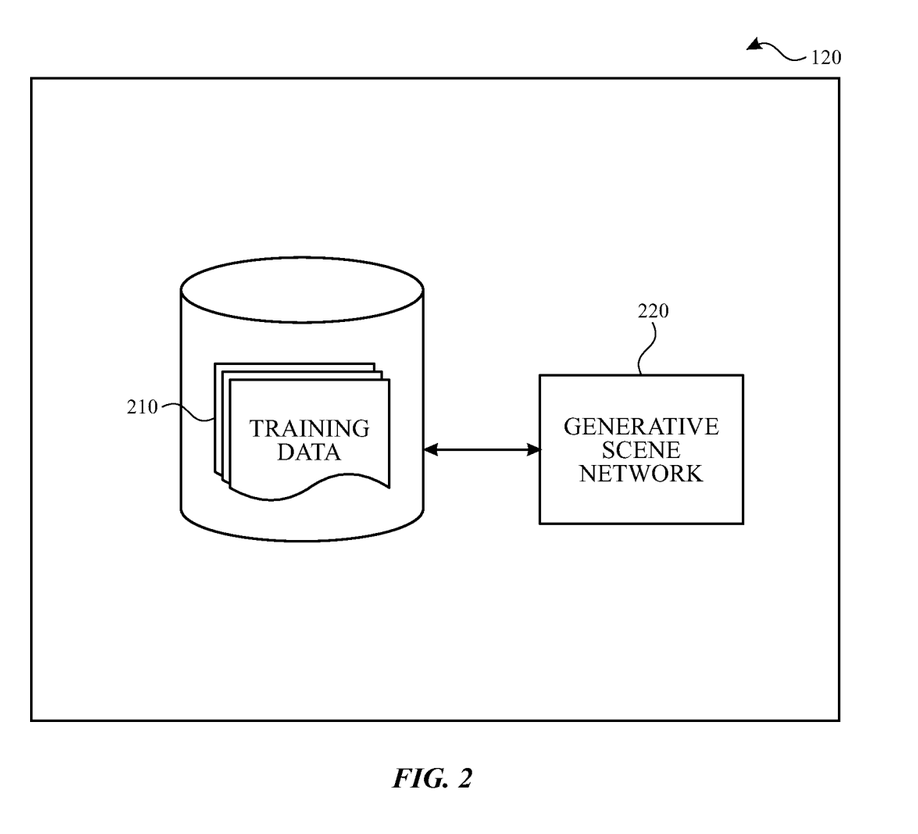
FIG. 2 illustrates an example computing architecture for a system for providing generative scene networks in accordance with one or more implementations.

FIG. 2 illustrates an example computing architecture for a system implementing generative scene networks, in accordance with one or more implementations. For explanatory purposes, the computing architecture is described as being provided by the server 120, such as by a processor and/or memory of the server 120; however, the computing architecture may be implemented by any other electronic devices, such as the electronic device 110. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the server 120 includes training data 210 for training a machine learning model such as a generative scene network (GSN). In an example, the server 120 may utilize one or more machine learning algorithms that use training data 210 for training a GSN 220. GSN 220 may be implemented, for example, as a neural network having layers that each include nodes having associated weights and/or biases that can be adjusted during the training of the GSN 220.

Training data 210 may include two-dimensional inputs (e.g., images or portions of images), three-dimensional training inputs (e.g., depth maps or sensor data), and/or desired (e.g., training) outputs corresponding to the training inputs. As examples, the training data 210 may include input training data such as data from the VizDoom and Active Vision Datasets and/or images from a dataset such as the CelebA dataset, or any other suitable image dataset.

Figure 3:
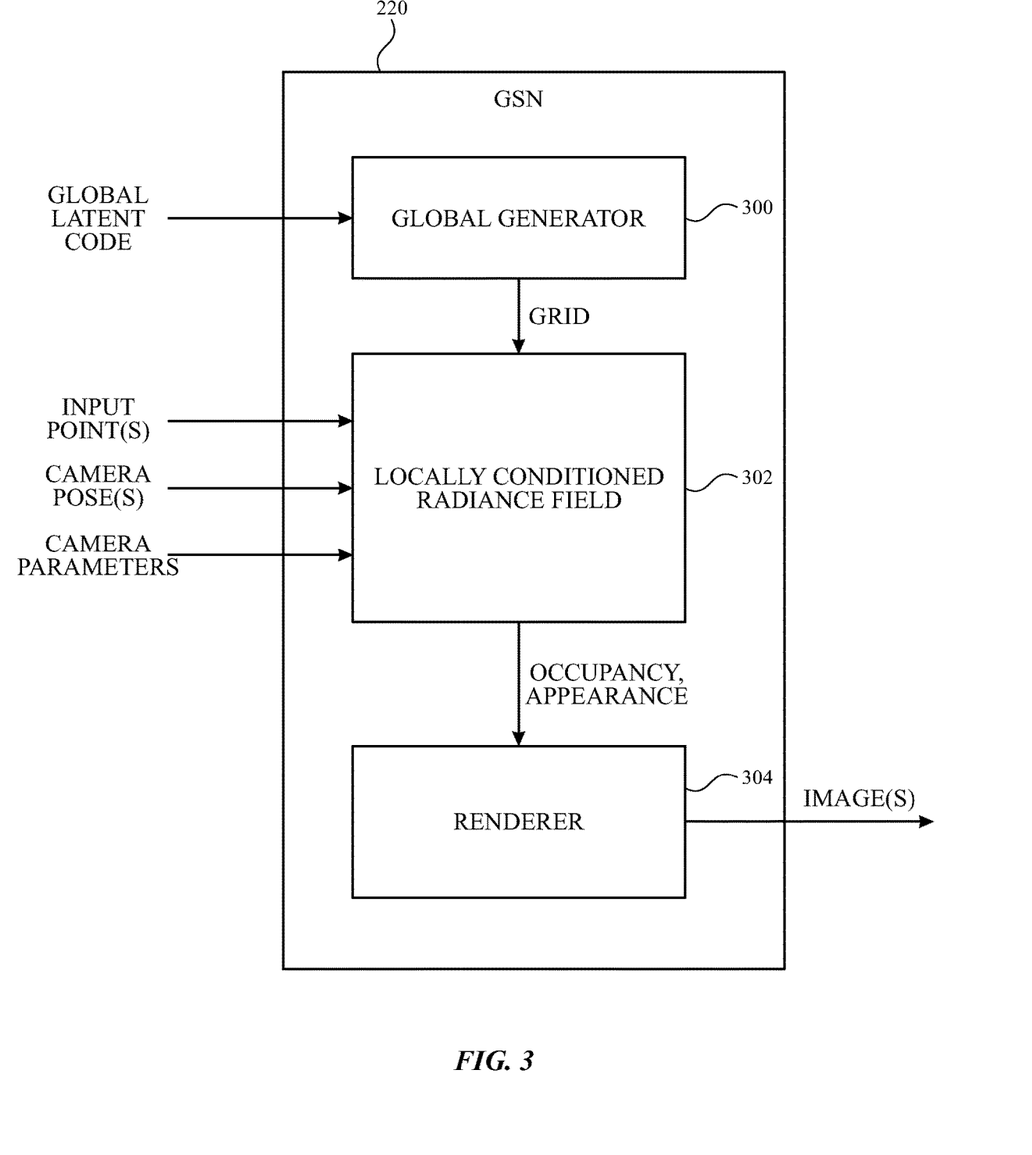
FIG. 3 illustrates a schematic diagram of a generative scene network in accordance with one or more implementations.

FIG. 3 illustrates a schematic diagram of a GSN that generates one or more images for one or more input points and/or one or more camera poses, in accordance with one or more implementations. In the example of FIG. 3, GSN 220 includes a global generator 300 and a locally conditioned radiance field 302. As shown, the GSN 220 may also include a renderer 304. However, in one or more implementations, the renderer 304 may be implemented separately from the GSN 220.

As shown, the global generator 300 (e.g., also referred to herein as g, or go) may be configured to generate a grid (e.g., a 2D grid) of latent codes (e.g., also referred to herein as W), such as local latent codes. For example, the global generator 300 may receive a global latent code (e.g., also referred to herein as z), and generate the grid of latent codes based on the global latent code. In one or more implementations, each of the local latent codes is configured, by the global generator 300, to be used for locally conditioning a radiance field.

The locally conditioned radiance field 302 (e.g., also referred to herein as f or fa) is configured to receive one or more input points (e.g., one or more points in three-dimensional space) as an input. The locally conditioned radiance field 302 may also receive, as inputs, one or more camera poses and one or more camera parameters (e.g., camera intrinsic parameters). The locally conditioned radiance field 302 may be configured, using the inputs, to be locally conditioned on a vector (e.g., w or $w_{i,j}$) sampled at a discrete location (e.g., (i, j)) from the grid of latent codes (e.g., using bi-linear sampling). In one or more implementations, the location (i,j) may be naturally given by the projection of the 3D input point p on the zx-plane (e.g., in an implementation in which they axis points up, or vertically, such as in alignment with a gravitational direction).

In one or more implementations, a scene may be generated with a generative scene network, and an image of the generated scene may be rendered based on the scene and an input viewpoint (e.g., the camera pose, which is also referred to herein as T[R, t]). In one or more implementations, generating the scene may include generating, with the locally conditioned radiance field 302, for each of a plurality of points in three-dimensional space, an occupancy ($\sigma$) and an appearance vector (a). As shown in FIG. 3, the occupancy and the appearance vector can be provided from the locally conditioned radiance field 302 to a renderer 304 (e.g., a volume renderer). Rendering the image (e.g., which is also referred to herein as $\hat{x}$) may include evaluating, for each of the plurality of points in three-dimensional space, the occupancy and the appearance vector at multiple locations along a ray (r) that extends between that point in three-dimensional space and the input viewpoint (e.g., where each pixel in the resulting image $\hat{x}$ corresponds to a ray, and the color, c, of pixel/ray r is obtained by approximating an integral, as described in further detail hereinafter in connection with Equation (1)). The input viewpoint may include a viewpoint location (e.g., an x, y, and/or z location in three-dimensional space), and a viewpoint orientation (e.g., an angle from the viewpoint location to the point in space).

Unlike 2D generative models which have no explicit concept of viewpoint, radiance fields take a camera pose for rendering. In one or more implementations, camera poses T[R, t] may be sampled from pose distribution $p_T$ in addition to a (e.g., global) latent code $z \sim p_z$, which can be challenging for the case of realistic scenes and a freely moving camera. For example, in accordance with one or more implementations, a stochastic weighted sampling over a set of candidate poses may be performed, where each pose is weighted by the occupancy at that location.

Figure 4:
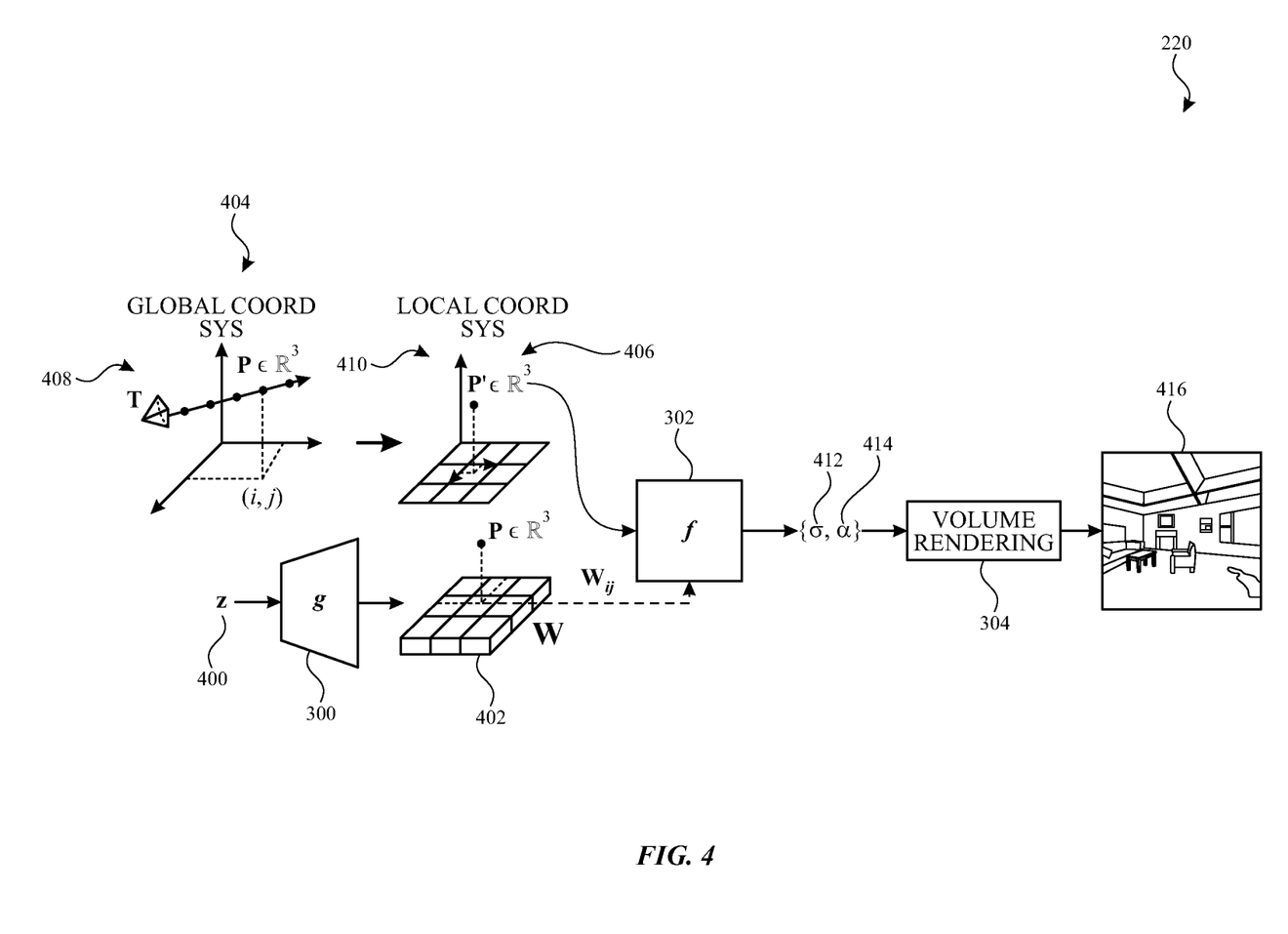
FIG. 4 illustrates aspects of an example architecture of a generative scene network in accordance with one or more implementations.

FIG. 4 illustrates a more detailed schematic diagram of an example architecture of a GSN, in accordance with one or more implementations. As shown in FIG. 3 in one or more implementations, in the architecture of the GSN 220, a global latent code $z \sim N(0,I)$ that is fed to a global generator 300 (e.g., $g_\theta$) is sampled, producing a local latent grid W (e.g., a 2D grid of latent codes). This local latent grid W may conceptually represent a latent scene "floorplan", and may be used for locally conditioning a radiance field $f_\theta$ from which images are rendered via volumetric rendering with renderer 304.

The GSN 220 may include a generator, $G_\theta: p_z \times SE(3) \times \mathbb{R}^{3 \times 3} \to \mathbb{R}^{3 \times w \times h}$, and a discriminator, $D_\phi: \mathbb{R}^{3 \times w \times h} \to [0,1]$, where $p_z$ is the prior distribution. However, the generator has special structure, since in addition to a sample $z \sim p_z$ as input, it also takes a camera pose $T \in SE(3)$ from pose distribution $p_T$, as well as camera intrinsic parameters $K \in \mathbb{R}^{3 \times 3}$, which are used to render an image via a radiance field. Furthermore, as shown in FIG. 3, the generator $G_\theta$ may be decomposed into two different networks $G_\theta = g_\theta \cdot f_\theta$ (noting that the same parameter subscript may be used for both g and f since they are jointly optimized in the generator step): a global generator $g_\theta: p_z \to \mathbb{R}^{c \times s \times s}$ and a locally-conditioned radiance field $f_\theta: \mathbb{R}^3 \times \mathbb{R}^c \to \mathbb{R} \, \mathbb{R}^c \times [0,1]$ which is rendered using the camera pose and intrinsic parameters.

As shown in FIG. 4, the global generator 300 (e.g., $g_\theta$) may take, as input, a latent code 400 (e.g., $z \sim p_z$). This latent code 400 may represent the geometry and appearance of the full scene.

In some implementations, this latent code 400 can be used to condition a multilayer perceptron (MLP) representing a single radiance field. This MLP conditioning approach can be effective when representing individual object categories, such as cars or faces, but may not scale well to large, densely populated scenes. In some implementations, the model capacity can be increased, but scale increases have diminishing returns with respect to render quality.

A more effective approach is to instead distribute a scene among many smaller latent codes, such that each latent code can specialize on representing a local region, as illustrated in FIG. 4. For example, as shown in FIG. 4, the global generator 300 of the GSN 220 can map the global latent code 400 (e.g., z) to a grid of local latent codes 402 (e.g., W).

In the example of FIG. 4, the global generator 300 (e.g., $g_\theta: p_z \to \mathbb{R}^{c \times s \times s}$) generates a 2D grid of latent codes 402 (e.g., $W \in \mathbb{R}^{c \times s \times s}$). This 2D grid can be conceptually interpreted, for example, as a latent floorplan representation of a scene, where each latent code is used to locally condition a radiance field. Note that, although a 2D representation is illustrated and may be more memory efficient than a 3D grid, a 3D grid can also be generated by the global generator in other implementations.

The architecture of the global generator 300 may include a mapping network, and may be free of skip connections (e.g., as illustrated in further detail in FIG. 5, discussed below).

As discussed herein, the GSN 220 may render an image 416 of a generated scene from a particular viewpoint or camera pose 408. For example, the GSN 220 may render an image 416 (e.g., $\hat{X} \in \mathbb{R}^{3 \times w \times h}$), given a grid of latent codes 402 (e.g., $W \in \mathbb{R}^{c \times s \times s}$), and a camera pose 408 (e.g., T=[R, t]$\in$SE(3)) and camera intrinsic parameters $K \in \mathbb{R}^{3 \times 3}$.

For example, as shown in FIG. 4, the GSN 220 may model scenes with a locally conditioned radiance field 302 (e.g., f: $\mathbb{R}^5 \times \mathbb{R}^c \to [0,1] \times \mathbb{R}^3$ or f: $\mathbb{R}^3 \times \mathbb{R}^c \to [0,1] \times \mathbb{R}^3$ f:). As shown, the locally conditioned radiance field 302 may receive, as input, a 3D point 406 (e.g., in a local coordinate system 410) and may be locally conditioned on a vector $w_{ij} \in$ $\mathbb{R}^3$ sampled at a discrete location (i,j) from the grid of latent codes W (e.g., using bi-linear sampling). The location (i,j) may be naturally given by the projection of the 3D input point on the zx-plane (assuming they axis points up or vertically, such as along a gravitational direction).

In some implementations, radiance fields can been defined over $\mathbb{R}^3$ without considering issues with the coordinate system, which can be successful due to either overfitting to single scenes or considering object categories that share a canonical orientation, such as cars or faces. However, modelling realistic scenes surfaces a challenge, since there may be no canonical orientation shared across scenes. Even with a constraint that they axis points in the gravity direction, there still exist infinite coordinate systems due to rotation over y. In some implementations, a global coordinate system 404 can be used, which can result in losing equivariance properties with respect to rotation along y even when using a grid of local latent codes to represent a scene.

In accordance with one or more implementations, such as in the example of FIG. 4, the GSN 220 may re-normalize the coordinate system for each latent code in the grid, introducing a local coordinate system 410 for every locally conditioned radiance field 302. Practically, this means that each locally conditioned radiance field 302 represents 3D points in the same coordinate system (e.g. input points to the radiance get the same coordinates), independently of its position on the grid.

As shown in FIG. 4, the locally conditioned radiance field 302 (e.g., f) may output two variables: an occupancy 412 (e.g., $\sigma \in (0,\infty)$) and an appearance vector 414 (e.g., $a \in \mathbb{R}^3$). To render the image 416 (e.g., $\hat{x}$) given f, the renderer 304 may use Equation 1 below for implicit volumetric rendering, and densely evaluate f on points uniformly sampled along ray directions r, where each pixel in the image 416 (e.g., $\hat{x}$) corresponds to a ray and the color $c \in \mathbb{R}^3$ of a pixel and/or ray r is obtained by approximating the integral in Eq. 1.

$$c(r,W) = \int_{u_a}^{u_f} Tr(u) \sigma(r(u), w_{ij}) a(r(u), d, w_{ij}) du$$

$$Tr(u) = \exp(-\int_{u_n}^{u} \sigma(r(u), w_{ij}) du) \quad (1)$$

In one or more implementations, for computationally efficiency, instead of rendering the image $\hat{x}$ as in the examples of FIGS. 3 and 4, the renderer 304 may render a feature map, and the rendered feature map may then be upsampled (e.g., with a upconv layer) to render the image $\hat{x}$.

Figure 5:
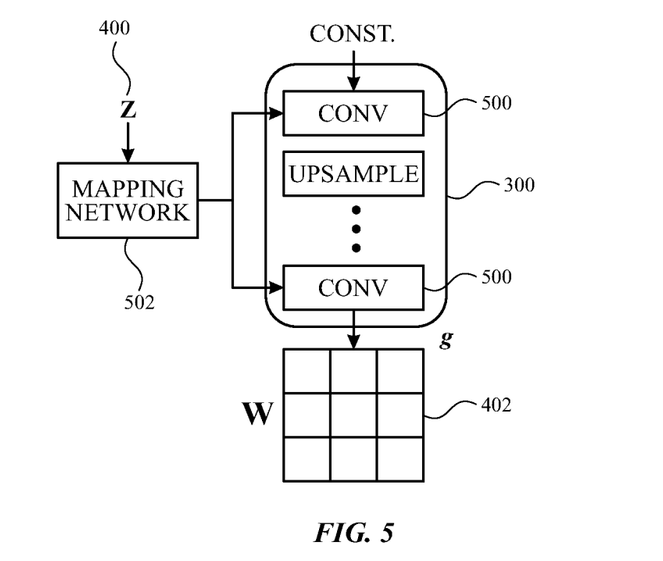
FIG. 5 illustrates aspects of an example architecture of a global generator of a generative scene network in accordance with one or more implementations.

FIG. 5 illustrates an example architecture of a global generator of a GSN, in accordance with one or more implementations. As shown in FIG. 5 in one or more implementations, the global generator 300 (e.g., g) may have an architecture that uses a mapping network 502 that receives the latent code 400, and that modulates a set of convolutional blocks 500 to generate the grid of latent codes 402 (e.g., W).

Figure 6:
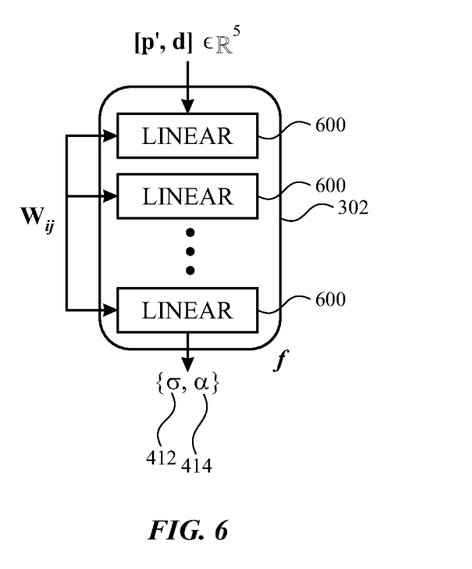
FIG. 6 illustrates aspects of an example locally conditioned radiance field in accordance with one or more implementations.

FIG. 6 illustrates an example architecture of a locally conditioned radiance field of a GSN, in accordance with one or more implementations. As shown in FIG. 6, in one or more implementations, in the architecture of the locally conditioned radiance field 302, a latent code 600 (e.g., $w_{ij}$) sampled from W is used to modulate linear layers 600 of the locally conditioned radiance field, f, to generate the occupancy 412 and the appearance vector 414.

In one or more implementations, the generative scene networks disclosed herein may be implemented using a convolutional discriminator architecture. The convolutional discriminator architecture may include residual connections, a minibatch standard deviation layer, and bilinear filtering before each downsampling operation. In one or more implementations, the discriminator receives, as input, an image, concatenated with corresponding depth map normalized between [0,1], and predicts whether the input comes from the true distribution or the generated distribution. In one or more implementations, the discriminator may include a small decoder $C_\psi$, and may to enforce a reconstruction penalty on real images. In one or more implementations, the decoder receives, as input, 4×4 resolution feature maps from the discriminator, and applies successive transposed convolutions with a stride of 2 to upsample the input until the original resolution is recovered.

In one or more implementations, the electronic device 110 or another device or system may train the GSN (e.g., the global generator and/or the locally conditioned radiance field), and deploy the trained GSN to the electronic device 110 and/or one or more other devices or systems. For convenience in describing the training of a GSN such as the GSN 220, let $\chi = \{x_j\}_{i=1:n} : x_i \in \mathbb{R}^{3 \times u \times h}$ denote the set of samples obtained by recording camera trajectories on a true distribution of scenes $p_S$. In this context, a generative scene network may be trained by optimizing a non-saturating GAN loss with an R1 gradient penalty, as well as a discriminator reconstruction objective, which may be given by Equation (2) below:

$$\mathcal{L}(\theta, \phi, \omega) = E_{z \sim p_z, T \sim p_T}[h(D_\phi(G_\theta(z, T)))] + \quad (2)$$
$$E_{X \sim ps}[h(-D_\phi(X)) + \lambda_{R1}|\nabla D_\phi(X)|^2 + \lambda_{Recon}|X - C_\omega(D_\phi(X))|^2],$$

where $h(u) = -\log(1 + \exp(-u))$.

In one or more implementations, the optimization may be performed using an RMSprop optimizer with $\alpha = 0.99$, $\varepsilon = 10.8$, and a learning rate of 0.002 for both the generator and discriminator. In one or more implementations, the learning rate of the mapping network may be set to approximately one hundred less than the rest of the network for improved training stability. In one or more implementations, an equalized learning rate may be used for one or more (e.g., all) learnable parameters, and an exponential moving average of the generator weights with a decay of 0.999 may be used to stabilize test-time performance. In one or more implementations, differentiable data augmentations, such as random translation, color jitter, and cutout may be applied to some or all inputs to the discriminator in order to combat overfitting on the training set.

Unlike standard 2D generative models which have no concept of viewpoint, radiance fields can incorporate a camera pose for rendering. For the generative scene networks described herein, camera poses $T = [R|t] \in SE(3)$ may be sampled from a pose distribution $p_T$, in addition to the latent code $z \sim p_z$. This can be challenging for a use case of generating realistic scenes while allowing a freely moving camera. In one or more implementations, this issue can be avoided by training on datasets containing objects placed at the origin, where the camera is constrained to live on a viewing sphere around the object and oriented towards the origin.

However, for the GSNs disclosed herein, in one or more implementations, sampling camera poses becomes more challenging due to the absence of constraints (e.g., $T \in SE(3)$), such as being constrained to a sphere, and the possibility of sampling invalid locations, such as inside walls or other solid objects which sporadically populate the scene. To address these challenges, sampling of camera poses may include a stochastic weighted sampling over a set of candidate poses, where each pose is weighted by the occupancy at that location. Candidate poses may be expressed relative to a middle step in a small neighboring trajectory (e.g., using trajectories of 40 steps during training). This normalization enforces an egocentric coordinate system whose origin lies at the center of W. For sampling the candidate poses, the generator may be queried at each candidate location to retrieve the corresponding occupancy, and the occupancy values can be normalized with a softmin operation to produce sampling weights for a multinomial distribution. This sampling strategy reduces the likelihood of sampling invalid camera locations, while also retaining stochasticity that facilitates scene exploration and sample.

The GSNs described herein have been demonstrated using both quantitative and qualitative experimental results on different settings. These demonstrations include comparisons of the generative performance of GSNs with other approaches that do not include GSNs. These demonstrations include ablation experiments, described in further detail hereinafter, that show the quantitative improvement obtained GSNs. These demonstrations also include results, described in further detail hereinafter, on view synthesis by inverting a GSN and asking the model to predict views of a scene given a set of input observations.

For example, the generative performance of GSNs can be compared with two other approaches: a generative adversarial network (GAN) and a generative radiance fields for 3D-Aware Image Synthesis (GRAF).

Comparisons with GAN and GRAF described herein include comparisons on three different datasets: the Viz-Doom environment, which is a synthetic computer-generated world, the Replica dataset, which contains eighteen scans of realistic scenes that can be rendered using the Habitat environment, and the Active Vision Dataset (AVD), which consists of 20 k images with noisy depth measurements from nine real world scenes. To generate data for these experiments, in one implementations, one hundred sequences of one hundred steps each are rendered, where an interactive agent explores a scene collecting RGB and depth observations as well as camera poses. At training time, sub-sequences can be sampled, and camera poses can be expressed relative to the camera pose of the middle frame in the sub-sequence. This removes the dependency of the radiance field on a canonical coordinate system, which can be particularly important for the GSNs described herein, since, as opposed to, for example, Shapenet objects or CelebA faces, scenes do not share a canonical orientation. Both GRAF and GAN are use a 1D latent code to represent the radiance field. GRAF disentangles shape and appearance, while GAN does not disentangle but uses a periodic activation function. While 1D representation of radiance fields in GRAF and GAN can deal with some objects within a category, or a single scene, this 1D representation does not scale to multiple scenes. Table 1 shows quantitative performance as quantified using a Frechet Inception distance (FID) and SwAV-FID, for each of GAN, GRAF, and GSN, for each dataset.

TABLE 1

|  | VizDoom | | Replica | | Active Vision | |
| --- | --- | --- | --- | --- | --- | --- |
|  | FID ↓ | SwAV-FID ↓ | FID ↓ | SwAV-FID ↓ | FID ↓ | SwAV-FID ↓ |
| π-GAN | 143.55 ± 4.81 | 15.26 ± 0.15 | 166.55 ± 3.61 | 13.17 ± 0.20 | 98.76 ± 1.49 | 9.54 ± 0.29 |
| GRAF | 47.50 ± 2.13 | 5.44 ± 0.43 | 65.37 ± 1.64 | 5.76 ± 0.14 | 62.59 ± 2.41 | 6.95 ± 0.15 |
| GSN (Ours) | 37.21 ± 1.17 | 4.56 ± 0.19 | 41.75 ± 1.33 | 4.14 ± 0.02 | 51.11 ± 1.37 | 6.59 ± 0.03 |

As shown in Table 2, GSN obtains improved performance over both GAN and GRAF, as shown by a FID score improvement of 10-14 absolute points.

The results in Table 2 show that a GSN as described herein obtains much better generative performance than GAN and GRAF, which may be provided by the capacity of the GSN model to learn a grid of locally conditioned radiance fields (each of which defines its own coordinate system) as opposed to a global radiance field in other approaches. In addition, qualitative scene interpolation, by interpolating latent codes, also results in smooth transitions of floorplan geometry or scene appearance.

Figure 7:
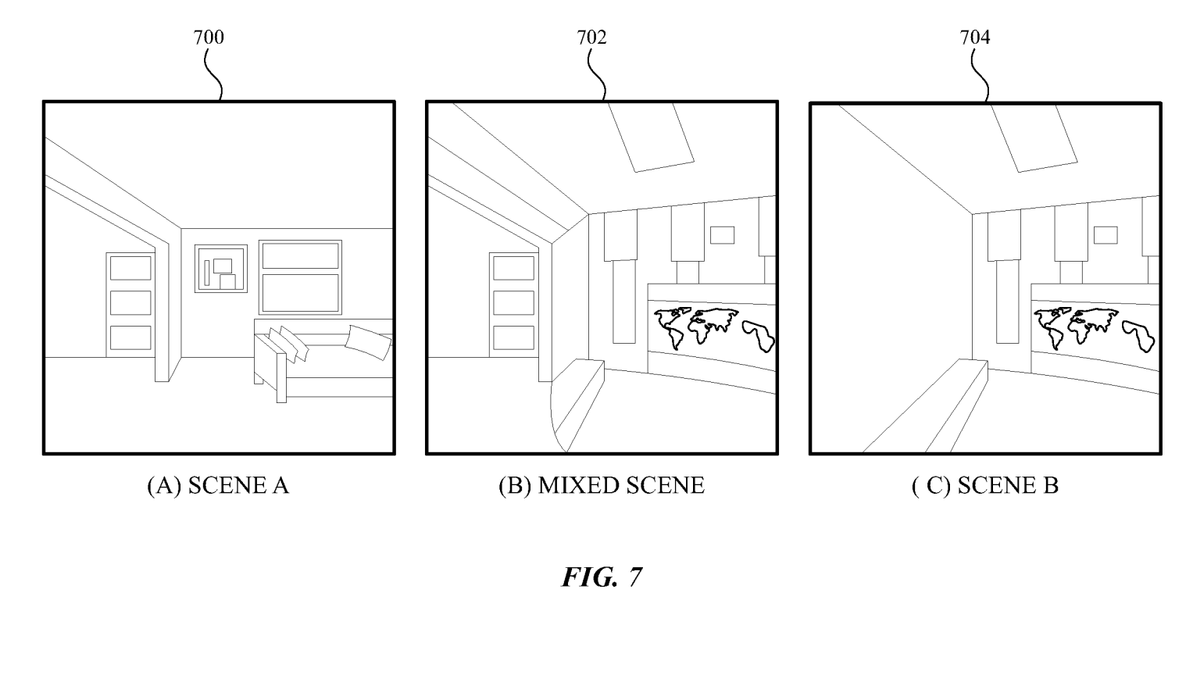
FIG. 7 illustrates an example image of a mixed scene generated from two different scenes in accordance with one or more implementations.

The latent code grid of the GSNs disclosed herein also enables intuitive scene editing by stitching together W's representing different scenes, as shown in the example of FIG. 7. For example, scene editing can be performed by splicing together local latent codes from two different scenes. As shown in FIG. 7, GSN completes the end of the bench and wall from a first scene 700 (e.g., Scene A) so that they merge smoothly with a second scene 704 (e.g., Scene B) to form a mixed scene 702.

Ablation experiments performed using GSNs as described herein show how different settings affect the generative performance of GSN. As an example, for ablation, an analysis may be performed on the Replica dataset at 64×64 resolution, and the following factors may be analyzed: (i) latent code representation (global vs local), (ii) global and local coordinate systems on the learned representation, (iii) sampled trajectory length, (iv) depth resolution for successfully learning a scene prior, and (v) regularization applied to the discriminator.

With respect to factor (i) above, Table 3 below shows a comparison of the effect of replacing the local latent codes $W \in \mathbb{R}^{c \times s \times s}$ of the GSNs described herein with a global latent code $w \in \mathbb{R}^c$ that globally conditions the radiance field $f_\theta$. As shown in Table 3, by decomposing the scene into many independent locally conditioned radiance fields as described herein, GSNs obtain improved generative performance.

TABLE 2

| Model | FID ↓ | SwAV-FID ↓ |
| --- | --- | --- |
| GSN + global latent | 68.42 ± 3.88 | 6.14 ± 0.24 |
| GSN + local latents | 41.75 ± 1.33 | 4.14 ± 0.02 |

With respect to factor (ii) above, GSN performance can also be measured using FID, by applying a 2D rotation to the local latent grid W when trained using a global coordinate system for the whole scene or a local coordinate system for each latent code in the grid. In this analysis, the global coordinate system entangles the radiance field to a fixed coordinate system resulting in drastically increasing FID scores as the angle of rotation for W increases. In contrast, the local coordinate system provided by the GSNs described herein show a better behavior as each locally conditioned radiance field uses a re-normalized coordinate system. This property of the local latent grid may be desirable since scenes do not share a canonical orientation, as opposed to, for example, ShapeNet or CelebA faces.

With respect to factor (iii) above, an analysis of the effect of how long the trajectories that the sampled camera poses belong to can be analyzed with respect to the representation of large scenes. In one or more implementations, GSNs may normalize with respect to a middle step in a trajectory. For this reason, if the trajectories are too short, the model may only explore small local neighborhoods and may be unsuccessful in representing long displacements in camera poses during evaluation. Based on this analysis (e.g., by evaluating FID scores when evaluating short one-step trajectories vs. long ten-step trajectories), in one or more implementations, trajectory lengths during training may be, for example, four steps, five steps, more than four steps, eight steps, ten steps, or more than ten steps. Using these trajectories during training may allow a GSN, during evaluation, to perform successfully for both short (e.g., one step or less than three step) trajectories and long (e.g., four or more step) trajectories. In one or more implementations, models trained on short trajectories may be unable to generalize to long trajectories during evaluation and models trained with long trajectories may be successful when evaluated in short trajectories or long trajectories (e.g., as shown by the stability of the FID when evaluated in short trajectories for models trained using long trajectories).

With respect to factor (iv) above, the sensitivity of GSNs to the amount of depth information used during training can be tested by down-sampling both real and generated depth maps to the target resolution and then up-sampling back to the original resolution before concatenating with the corresponding image and feeding the up-sampled maps to the discriminator. Based on this analysis, in one or more implementations, the depth resolution of a GSN can be reduced to, for example, a few pixels or a single pixel without finding statistically significant reduction in the generated image quality. This is an exciting result, that enables GSNs to be trained in settings with sparse depth information for various applications.

With respect to factor (v) above, based on an analysis of regularization of the discriminator, $D_\phi$, (e.g., as shown in Table 3 below) the discriminator may regularized in one or more implementations. For example, Table 3 below shows that data augmentation and a discriminator reconstruction penalty may both be beneficial. Table 3 also illustrates that the R1 gradient penalty offers an additional improvement of training stability for GSNs, helping adversarial learning to converge.

TABLE 3

| Model | FID ↓ | SwAV-FID ↓ |
|---|---|---|
| GSN (full model) | 41.75 ± 1.33 | 4.14 ± 0.02 |
| R1 gradient penalty | 52.9 ± 19.9 | 4.56 ± 1.50 |
| Reconstruction penalty | 274.3 ± 41.4 | 23.58 ± 4.11 |
| Data augmentation | 412.25 ± 14.34 | 35.71 ± 9.51 |

GSNs can also be beneficial in comparison with scene-level view synthesis using other approaches including Generative Temporal models with Spatial Memory (GTM-SM) and Incremental Scene Synthesis (ISS) models (e.g., particularly for scene level view synthesis of free moving cameras in which camera motions are not constrained to parallax). In this analysis, a view synthesis task is defined as follows: for a given step t in a sequence the model predicts the target t+5 views $\mathcal{T} = \{(X,T)_i\}_{iwt:t+s}$ conditioned on the source t−5 views $\mathcal{S} = \{(X,T)_i\}_{iwt-5:t}$ along the camera trajectory. Note that this problem is unrelated to video prediction, since the scenes are static and camera poses for source and target views are given in video prediction. To tackle this view synthesis task, both GTM-SM and ISS rely on auto-encoder architectures augmented with memory mechanisms that directly adapt to the conditional nature of the task.

For view synthesis using GSN, GAN inversion may be used, adopting a hybrid inversion approach in which an encoder is first trained on $(W,\hat{x})$ tuples sampled from a trained GSN. At inference time, the source views $\mathcal{S} = \{(X,T)_i\}_{iwt-5:t}$ are fed through the GSN encoder to predict an initialization latent code grid $W_0$ that is then optimized via SGD to get $\hat{W}$. The optimization process may be performed by freezing the weights of f and computing a reconstruction loss with respect to $\mathcal{S}$. $\hat{W}$ may then be used in the locally conditioned radiance field and observations can be rendered using the camera poses of the target views $\mathcal{T}$.

Table 4 below shows view synthesis results on Vizdoom and Active Vision datasets, with respect to two different aspects: the capacity to fit the source views or Memorization (e.g. reconstruction), and, the ability to predict the target views or Hallucination (e.g. scene completion) using L1 and SSIM metrics. As illustrated by Table 4, GSN outperforms both GTM-SM and ISS (even if the GSN was not trained to explicitly learn a mapping from $\mathcal{S}$ to $\mathcal{T}$ which can be attributed to the powerful scene prior learned by GSN).

TABLE 4

| | Memorization | | Hallucination | |
|---|---|---|---|---|
| | L1 ↓ | SSIM ↑ | L1 ↓ | SSIM ↑ |
| GTM-SM | 0.09 | 0.52 | 0.13 | 0.49 |
| ISS | 0.09 | 0.56 | 0.11 | 0.54 |
| GSN | 0.07 | 0.66 | 0.11 | 0.57 |
| GTM-SM | 0.37 | 0.12 | 0.43 | 0.1 |
| ISS | 0.22 | 0.31 | 0.25 | 0.23 |
| GSN | 0.15 | 0.54 | 0.29 | 0.38 |

(a) View synthesis results on Vizdoom

Figure 8:
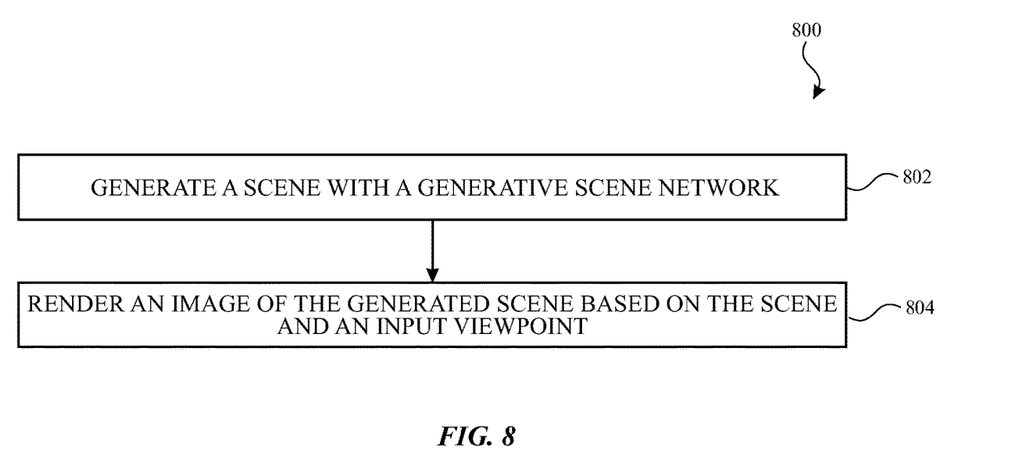
FIG. 8 illustrates a flow chart of example operations that may be performed for generating scene images using a generative scene network in accordance with one or more implementations.

FIG. 8 illustrates a flow diagram of an example process 800 for scene generation and/or rendering, in accordance with one or more implementations. For explanatory purposes, the process 800 is primarily described herein with reference to the electronic device 110 of FIG. 1. However, the process 800 is not limited to the electronic device 110 of FIG. 1, and one or more blocks (or operations) of the process 800 may be performed by one or more other components and/or other suitable devices or systems. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

In the example of FIG. 8, at block 802, the process 800 may include generating a scene with a generative scene network (e.g., GSN 220) at an electronic device (e.g., electronic device 110). The generative scene network may include a global generator (e.g., global generator 300) and a locally conditioned radiance field (e.g., locally conditioned radiance field 302). In one or more implementations, the electronic device and/or the GSN may include a renderer such as a volumetric renderer (e.g., renderer 304). In one or more implementations, the global generator is free of skip connections.

In one or more implementations, generating the scene may include, with the global generator, generating a grid of latent codes, each of which is configured for locally conditioning a radiance field. In one or more implementations, generating the scene may also include, with the locally conditioned radiance field, receiving a point in three-dimensional space as an input. In one or more implementations, the locally conditioned radiance field is configured to be locally conditioned on a vector sample at a discrete location from the grid of latent codes.

In one or more implementations, the electronic device may also re-normalize a coordinate system for each latent code in the grid of latent codes to introduce a local coordinate system for every locally conditioned radiance field. In one or more implementations, generating the scene may include generating, with the locally conditioned radiance field and for each of a plurality of points in a three-dimensional space: an occupancy (e.g., sigma) and an appearance vector (e.g., a).

At block 804, the process 800 may include rendering, with the electronic device, an image (e.g., X) of the generated scene based on the scene and an input viewpoint (e.g., a camera pose, such as T). In one or more implementations, rendering the image may include evaluating, for each of the plurality of points in the three-dimensional space for which the occupancy and appearance vector have been generated by the locally conditioned radiance field, the occupancy and the appearance vector at multiple locations along a ray (e.g., r) that extends between that point in three-dimensional space and the input viewpoint (e.g., using Equation (1) as discussed above). In one or more implementations, the input viewpoint may include a viewpoint location and a viewpoint orientation.

In one or more implementations, the generating and the rendering may be repeated for a plurality of input viewpoints to generate and render a fly-through view of the scene. The plurality of input viewpoints may include a plurality of viewpoint locations (e.g., translationally separated viewpoint locations). In one or more implementations, the scene is a three-dimensional scene. In one or more implementations, generating the scene with the generative scene network may include inputting a sparse set of scene observations to the generative scene network, and inferring additional scene observations with the generative scene network.

In one or more implementations, the electronic device or another electronic device or system may also train the generative scene network. For example, training the generative scene network may include optimizing a non-saturating generative adversarial network (GAN) loss with a R1 gradient penalty, and a discriminator reconstruction objective (e.g., using Equation 2 as described above).

Figure 9:
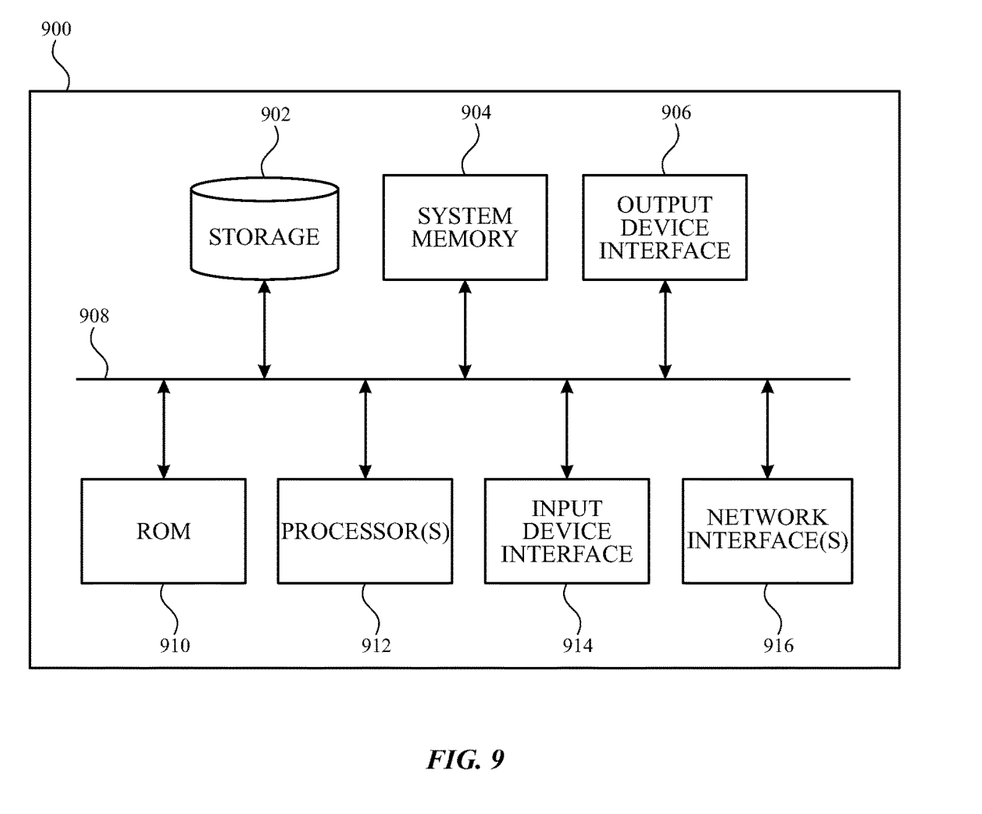
FIG. 9 illustrates an electronic system with which one or more implementations of the subject technology may be implemented.

FIG. 9 illustrates an electronic system 900 with which one or more implementations of the subject technology may be implemented. The electronic system 900 can be, and/or can be a part of, the electronic device 110, and/or the server 120 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 3, the bus 908 also couples the electronic system 900 to one or more networks and/or to one or more network nodes, such as the electronic device 110 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

As described above, one aspect of the present technology is the gathering and use of data available from specific and legitimate sources for training and/or executing generative scene networks. The present disclosure contemplates that in some instances, this gathered data may include personal information data that uniquely identifies or can be used to identify a specific person. Such personal information data can include images, videos, demographic data, location-based data, online identifiers, telephone numbers, email addresses, home addresses, device identifiers, data or records relating to a user's health or level of fitness (e.g., vital signs measurements, medication information, exercise information, EMG signals), date of birth, or any other personal information.

The present disclosure recognizes that the use of such personal information data, in the present technology, can be used to the benefit of users. For example, the personal information data can be used for training and/or executing generative scene networks. Accordingly, use of such personal information data may facilitate inference of the appearance of a scene from any viewpoint or orientation. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the case of training and/or executing generative scene networks, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
generating a scene with a generative scene network at an electronic device, wherein the generative scene network comprises:
a radiance field; and
a global generator for generating a grid of latent codes from a global latent code, each of which is configured for locally conditioning the radiance field; and
rendering, with the electronic device, an image of the generated scene based on the scene and an input viewpoint.

2. The method of claim 1, wherein the global generator is free of skip connections.

3. The method of claim 1, wherein generating the scene further comprises, with the locally conditioned radiance field, receiving a point in three-dimensional space as an input, and wherein the locally conditioned radiance field is configured to be locally conditioned on a vector sample at a discrete location from the grid of latent codes.

4. The method of claim 1, further comprising re-normalizing a coordinate system for each latent code in the grid of latent codes to introduce a local coordinate system for every locally conditioned radiance field.

5. The method of claim 1, wherein generating the scene comprises generating, with the locally conditioned radiance field and for each of a plurality of points in a three-dimensional space:
an occupancy; and
an appearance vector.

6. The method of claim 5, wherein rendering the image comprises evaluating, for each of the plurality of points in the three-dimensional space, the occupancy and the appearance vector at multiple locations along a ray that extends between that point in three-dimensional space and the input viewpoint.

7. The method of claim 6, wherein the input viewpoint comprises a viewpoint location and a viewpoint orientation.

8. The method of claim 7, further comprising repeating the generating and the rendering for a plurality of input viewpoints to generate and render a fly-through view of the scene.

9. The method of claim 8, wherein the plurality of input viewpoints comprise a plurality of viewpoint locations.

10. The method of claim 1, wherein the scene is a three-dimensional scene.

11. The method of claim 1, wherein generating the scene with the generative scene network comprises inputting a sparse set of scene observations to the generative scene network, and inferring additional scene observations with the generative scene network.

12. The method of claim 1, further comprising training the generative scene network by optimizing:
a non-saturating GAN loss with a R1 gradient penalty; and
a discriminator reconstruction objective.

13. A non-transitory machine-readable medium comprising code that, when executed by a processor, causes the processor to perform operations comprising:
generating a scene with a generative scene network at an electronic device, wherein the generative scene network comprises:
a radiance field; and
a global generator for generating a grid of latent codes from a global latent code, each of which is configured for locally conditioning the radiance field; and
rendering, with the electronic device, an image of the generated scene based on the scene and an input viewpoint.

14. The non-transitory machine-readable medium of claim 13, wherein generating the scene comprises:
with the locally conditioned radiance field and for each of a plurality of points in a three-dimensional space, generating:
an occupancy; and
an appearance vector.

15. A system comprising:
a processor; and
a memory device storing a generative scene network that includes a radiance field and a global generator for generating a grid of latent codes from a global latent code, each of which is configured for locally conditioning the radiance field, the memory device containing instructions, which when executed by the processor, causes the processor to:
generate a scene with the generative scene network; and
render an image of the generated scene based on the scene and an input viewpoint.

16. The system of claim 15, wherein the locally conditioned radiance field is configured to receive a point in three-dimensional space as an input, and to be locally conditioned on a vector sample at a discrete location from the grid of latent codes.

17. The system of claim 15, wherein generating the scene comprises generating, with the locally conditioned radiance field and for each of a plurality of points in a three-dimensional space:
an occupancy; and
an appearance vector.

18. The system of claim 17, wherein the processor is configured to render the image at least in part by evaluating, for each of the plurality of points in the three-dimensional space, the occupancy and the appearance vector at multiple locations along a ray that extends between that point in three-dimensional space and the input viewpoint.

* * * * *